United States Patent [19]

Suzuki

[11] 4,236,316
[45] Dec. 2, 1980

[54] VESSEL ADAPTABLE TO THE EXPANSION AND/OR CONTRACTION OF FLUID THEREIN

[76] Inventor: Kazuo Suzuki, 9-9 Tamagawa 4 chome, Setagaya-ku Tokyo, Japan

[21] Appl. No.: 55,282

[22] Filed: Jul. 6, 1979

[51] Int. Cl.³ .............................................. G01C 17/08
[52] U.S. Cl. ............................... 33/364; 33/DIG. 19
[58] Field of Search ................. 220/8, 85 B, 357, 358; 33/364, DIG. 19; 285/231

[56] References Cited

U.S. PATENT DOCUMENTS

| | | | |
|---|---|---|---|
| 2,045,003 | 6/1936 | Staley | 220/8 |
| 3,069,783 | 12/1962 | Dinsmore | 33/364 |
| 3,497,963 | 3/1970 | Von Meyer | 33/364 |
| 3,831,954 | 8/1974 | Longfellow | 285/231 |

*Primary Examiner*—George T. Hall
*Attorney, Agent, or Firm*—Holman & Stern

[57] ABSTRACT

A vessel for enclosing fluid, particularly a vessel adapting itself to the expansion and/or contraction of fluid for preventing the occurrence of air-bubbles in the fluid enclosed in the vessel.

3 Claims, 4 Drawing Figures

VESSEL ADAPTABLE TO THE EXPANSION AND/OR CONTRACTION OF FLUID THEREIN

BRIEF DESCRIPTION OF THE INVENTION

This invention relates to a vessel for accommodating fluid, over the outer peripheral surface of the body of which vessel is inserted an O-ring, the body of the vessel being designed to be sealed with said O-ring which is pressed against the inner peripheral surface of a lid which is displaceable due to the changes of temperature, thereby allowing the volume of the content therein to be changed naturally, said vessel being thus capable of adapting itself to the expansion and/or contraction of fluid contained therein.

Conventional vessels proposed as a countermeasure for the expansion of fluid in the vessels due to the temperature changes are extremely complicated in their construction and, in particular, when air-bubbles arise therein there have been formed diaphragms, chambers and/or separate air chambers in order to eliminate them. However, diaphragms are not only apt to break off because of their thin material used but also have disadvantages such that the bonded parts thereof tend to come off, while being furthermore impossible to be formed in a globular form. While chambers are sealed with packings, air may sometime go upwardly over the packings, and there are also certain drawbacks that the volumetric balance of the upper and lower chambers is difficult to maintain.

An object of the present invention is to provide a solid vessel adapting itself through a very simple structure to the expansion and/or contraction of the fluid within the vessel due to the changes of temperature therein.

Another object of the present invention is to provide a vessel unlimited in shapes and being sure and correct in operation.

BRIEF DESCRIPTION OF THE SEVERAL VIEWS OF THE DRAWING

The invention will now be described in more detail with reference to the accompanying drawings showing one preferred embodiment of a vessel according to the present invention which is adaptable to the expansion and/or contraction of fluid, wherein.

DETAILED DESCRIPTION OF THE INVENTION

Figure 1:
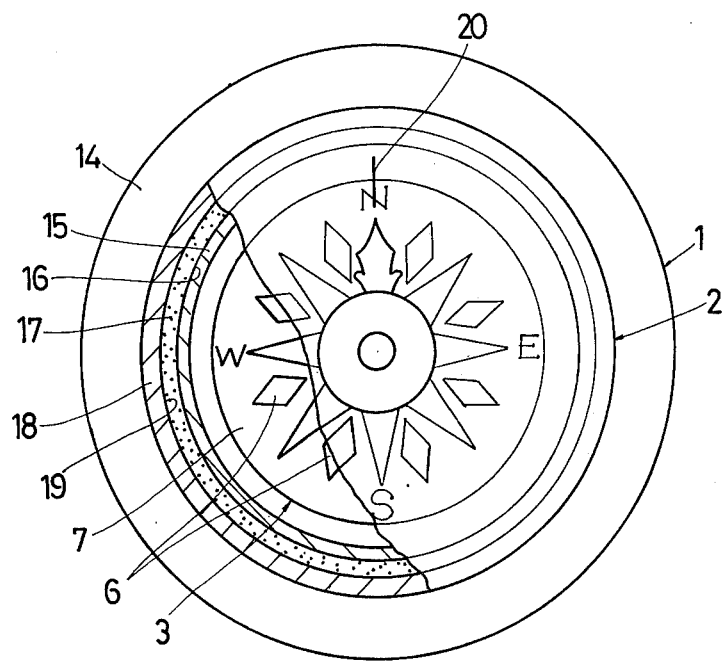
FIG. 1 is a top plan view of the vessel.
Figure 2:
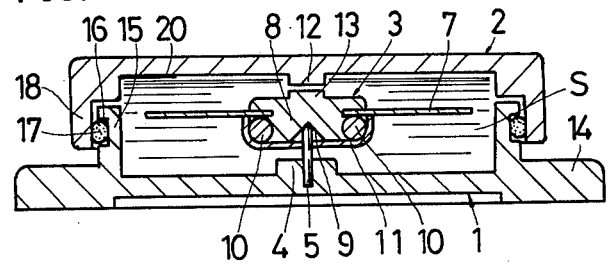
FIG. 2 is a longitudinal sectional elevation thereof.

In the present invention, in order to attain the objects of the invention by sufficiently utilizing the features of the O-ring that will never lose its sealing effect even against any sliding motion thereof, it is designed that the lid applied to the vessel is displaceable in a sealed condition to accommodate the expansion and/or contraction of the fluid in the vessel.

The O-ring of the present invention is made of synthetic rubber or any other similar material such that the cross section thereof is circular in form with its inner and outer diameters formed under a very strict allowance. In operation, an O-ring is generally installed in a rectangular packing groove precisely finished, the theory of leak-proofing being that when an O-ring with a collapsing allowance of about 10-12% is installed in a packing groove, sealing is effected by the elasticity of the O-ring itself in case the pressure applied thereon is low, but the ring will be subjected to a displacement as the pressure increases.

In the present invention, the operation of the ring described above is utilized to allow displacement of the lid to expand the capacity of the vessel so that this assembly may automatically accommodate itself to the expansion of fluid therein and the lid may naturally be returned to its original position as the fluid contracts.

Now, a preferred embodiment of a vessel adaptable to the expansion and/or contraction of fluid according to the present invention will be described hereinafter with reference to the accompanying drawings.

The embodiment shown in the drawings indicates a magnetic compass needle assembly for shipping incorporating the idea of the present invention, comprising a vessel body 1 for accommodation of isoparafine solution S, a lid 2 to be applied thereto and a needle portion 3. The vessel body 1 and the lid 2 are formed of transparent acrylic resin and an axle 5 is vertically provided on the central projecting portion of the inner bottom surface of the body 1. A compass 7, with its needle 6 indicated with ink, is mounted at its bottom conical portion 9 of the central bearing member 8 on the top of the axle 5 such that the permanent magnets 10, 10 are positioned and retained by holding frame 11 on both sides of the central bearing member 8. The bearing member 8 is provided on its upper surface with a boss portion 13 corresponding to the abutting boss portion 12 formed on the bottom surface of the lid 2.

Figure 3:
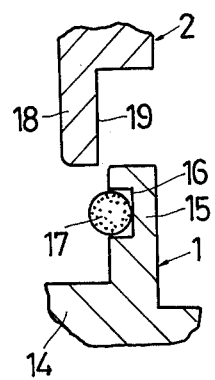
FIGS. 3 and 4 are fragmentary sectional views showing how a lid with an O-ring is inserted over the body of the vessel.
Figure 4:
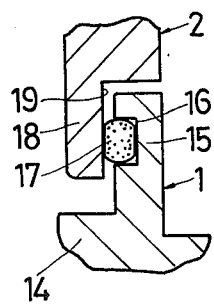

On the peripheral surface 15 integral with the base 14 of the vessel body 1 there is provided a rectangular packing groove 16 into which is inserted an O-ring 17. Then, the lid 2 is press-fitted from above, as shown in FIG. 3, with its inner surface 19 of the stepped peripheral portion 18 being confronted against the O-ring 17, thereby sealing the vessel body 1 with the O-ring compressed about 12% as shown in FIG. 4. The reference numeral 20 indicates a reference line provided on the lid 2.

According to the present invention, the volume of the vessel changes in accordance with the expansion of the fluid S within the vessel 1 due to the changes of temperature therein. However, no change in the sealing effect of the O-ring takes place as the lid 2 is displaced to accommodate the changes of the internal volume of the vessel.

I claim:

1. A magnetic needle assembly including a vessel comprised of a body and a lid and a needle member characterized in that said vessel body is a hollow body open at one end, said lid slidably interfits with said body to close said one end forming a chamber, a fluid within said chamber, said needle member being immersed in said fluid, a rectangular packing groove formed on the peripheral surface of one of the interfitting surfaces of the lid and the vessel body, an O-ring in said packing groove compressed by the peripheral surface of the other of said interfitting surfaces to seal said chamber, said vessel being capable of varying the volume of said chamber by displacement of said lid to accommodate expansion and contraction of said fluid.

2. A magnetic needle assembly according to claim 1 which is adaptable to thermal expansion and contraction of said fluid characterized in that said vessel body itself is of a non-circular form.

3. A magnetic needle assembly according to claim 1 which is adaptable to thermal expansion and contraction of said fluid therein, characterized in that said body and lid of said vessel are formed of synthetic resin such as acrylic resin and the like formable into thick products.

* * * * *